United States Patent
Acharya Chandrashekar et al.

(10) Patent No.: US 12,353,303 B2
(45) Date of Patent: Jul. 8, 2025

(54) OFFLOADING A TASK FROM AN EDGE SERVER THAT IS INTEGRATED WITH A MOVING VEHICLE

(71) Applicant: INTERNATIONAL BUSINESS MACHINES CORPORATION, Armonk, NY (US)

(72) Inventors: Charan Acharya Chandrashekar, Bangalore (IN); Sudhakar T. Seshagiri, Bangalore (IN); Prasanna Alur Mathada, Bangalore (IN); Shwetha Gopalakrishna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 18/304,223

(22) Filed: Apr. 20, 2023

(65) Prior Publication Data
US 2024/0354207 A1    Oct. 24, 2024

(51) Int. Cl.
*G06F 11/20* (2006.01)

(52) U.S. Cl.
CPC ........ *G06F 11/203* (2013.01); *G06F 2201/85* (2013.01)

(58) Field of Classification Search
CPC .. G06F 11/20; G06F 11/2002; G06F 11/2005; G06F 11/2025; G06F 11/203;
(Continued)

(56) References Cited

U.S. PATENT DOCUMENTS

| | | | | |
|---|---|---|---|---|
| 5,747,950 | A | * | 5/1998 | Friedrichsen .......... B63H 25/24 318/5 |
| 6,286,110 | B1 | * | 9/2001 | Klein .................. G06F 11/1474 714/10 |

(Continued)

FOREIGN PATENT DOCUMENTS

| CN | 108499100 B | 2/2021 |
|---|---|---|
| CN | 114520768 A | 5/2022 |

(Continued)

OTHER PUBLICATIONS

S. Hwang, et al., "Decentralized Computation Offloading with Cooperative UAVs: Multi-Agent Deep Reinforcement Learning Perspective", IEEE, IEEE Wireless Communications (vol. 29, Issue: 4, Aug. 2022), Aug. 2022, 17 pp.

(Continued)

*Primary Examiner* — Joseph O Schell
(74) *Attorney, Agent, or Firm* — KONRAD, RAYNES, DAVDA & VICTOR LLP; Janaki K. Davda

(57) ABSTRACT

Provided are techniques for offloading a task from an edge server that is integrated with a moving vehicle. One or more tasks are executed while performing monitoring of hardware and software components. In response to the monitoring, a failure is identified. In response to determining that the failure prevents the one or more tasks from being completed, a request message is broadcast to a plurality of peer moving edge servers to request assistance, an acknowledgement is received from each of the plurality of peer moving edge servers, one or more of the plurality of the peer moving edge servers is selected, and the one or more tasks are handed over to the selected one or more peer moving edge servers. In response to determining that the failure does not prevent the one or more tasks from being completed, continuing execution of the one or more tasks.

20 Claims, 9 Drawing Sheets

(58) Field of Classification Search
CPC ............. G06F 11/2028; G06F 11/2033; G06F 2201/85
See application file for complete search history.

(56) References Cited

U.S. PATENT DOCUMENTS

| | | | |
|---|---|---|---|
| 7,752,486 B2 * | 7/2010 | Satran | G06F 11/2033 709/227 |
| 2016/0308977 A1 * | 10/2016 | Ezell | H04L 65/1104 |
| 2021/0181739 A1 * | 6/2021 | Chen | B60W 40/105 |
| 2021/0191827 A1 * | 6/2021 | Arumugam | G06F 9/4856 |
| 2022/0147059 A1 * | 5/2022 | Borne-Pons | G06Q 10/0631 |
| 2022/0360485 A1 | 11/2022 | Lim et al. | |

FOREIGN PATENT DOCUMENTS

| | | | | |
|---|---|---|---|---|
| EP | 1258127 B1 * | 9/2003 | ........... | G06F 15/173 |
| KR | 102205593 B1 | 1/2021 | | |

OTHER PUBLICATIONS

J. Wang et al.,. "Online UAV-mounted Edge Server Dispatching for Mobile-to-Mobile Edge Computing", IEEE, IEEE Internet of Things Journal ( vol. 7, Issue: 2, Feb. 2020), Nov. 20, 2019, 11 pp.

"Wi-Fi Direct", Wikipedia, [online][retrieved Apr. 7, 2023] https://en.wikipedia.org/wiki/Wi-Fi_D, 6 pp.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http:/csrc.nist.gov/groups/SNS/cloud-computing/cloud-computing-v26.ppt>, Total 80 pp.

U.S. Appl. No. 18/170,016, filed Feb. 16, 2023, 39 pp.

C.E. Lin, et al., "Failure Analysis for an Unmanned Aerial Vehicle Using Safe Path Planning", Aerospace Research Central, vol. 17, Issue 7, Apr. 24, 2020, 41 pp., [online][retrived Apr. 16, 2023] https://arc.aiaa.org/doi/10.2514/1.10795).

* cited by examiner

OFFLOADING A TASK FROM AN EDGE SERVER THAT IS INTEGRATED WITH A MOVING VEHICLE

BACKGROUND

Embodiments of the invention relate to offloading a task from an edge server that is integrated with a moving vehicle. In addition, embodiments of the invention relate to a decentralized mechanism to dynamically offload a task from a failing edge server that is integrated with a moving vehicle.

Internet of Things (IoT) devices generally have very limited or no computation capability, and so it is difficult for IoT devices to process and store collected data. Edge computing brings the computation resource closer to the users and has the potential to help IoT devices by processing the data collected by these IoT devices. However, in some environments that are not easily accessible (e.g., areas such as farms, deserts, peaks, water bodies etc.), it may be difficult to install and maintain conventional edge servers. In addition, in such areas, there may be network and power issues.

SUMMARY

In accordance with certain embodiments, a computer program product comprising a computer readable storage medium having program code embodied therewith is provided, where the program code is executable by at least one processor to perform operations for offloading a task from an edge server that is integrated with a moving vehicle. In such embodiments, one or more tasks are executed while performing monitoring of hardware and software components. In response to the monitoring identifying a failure, it is determined whether the failure prevents the one or more tasks from being completed. In response to determining that the failure prevents the one or more tasks from being completed, a request message is broadcast to a plurality of peer moving edge servers to request assistance with completing the one or more tasks, an acknowledgement is received from each of the plurality of peer moving edge servers, one or more of the plurality of the peer moving edge servers is selected, and the one or more tasks are handed over to the selected one or more peer moving edge servers. In response to determining that the failure does not prevent the one or more tasks from being completed, continuing execution of the one or more tasks.

In accordance with other embodiments, a computer-implemented method comprising operations is provided for offloading a task from an edge server that is integrated with a moving vehicle. In such embodiments, one or more tasks are executed while performing monitoring of hardware and software components. In response to the monitoring identifying a failure, it is determined whether the failure prevents the one or more tasks from being completed. In response to determining that the failure prevents the one or more tasks from being completed, a request message is broadcast to a plurality of peer moving edge servers to request assistance with completing the one or more tasks, an acknowledgement is received from each of the plurality of peer moving edge servers, one or more of the plurality of the peer moving edge servers is selected, and the one or more tasks are handed over to the selected one or more peer moving edge servers. In response to determining that the failure does not prevent the one or more tasks from being completed, continuing execution of the one or more tasks.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for offloading a task from an edge server that is integrated with a moving vehicle. In such embodiments, one or more tasks are executed while performing monitoring of hardware and software components. In response to the monitoring identifying a failure, it is determined whether the failure prevents the one or more tasks from being completed. In response to determining that the failure prevents the one or more tasks from being completed, a request message is broadcast to a plurality of peer moving edge servers to request assistance with completing the one or more tasks, an acknowledgement is received from each of the plurality of peer moving edge servers, one or more of the plurality of the peer moving edge servers is selected, and the one or more tasks are handed over to the selected one or more peer moving edge servers. In response to determining that the failure does not prevent the one or more tasks from being completed, continuing execution of the one or more tasks.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
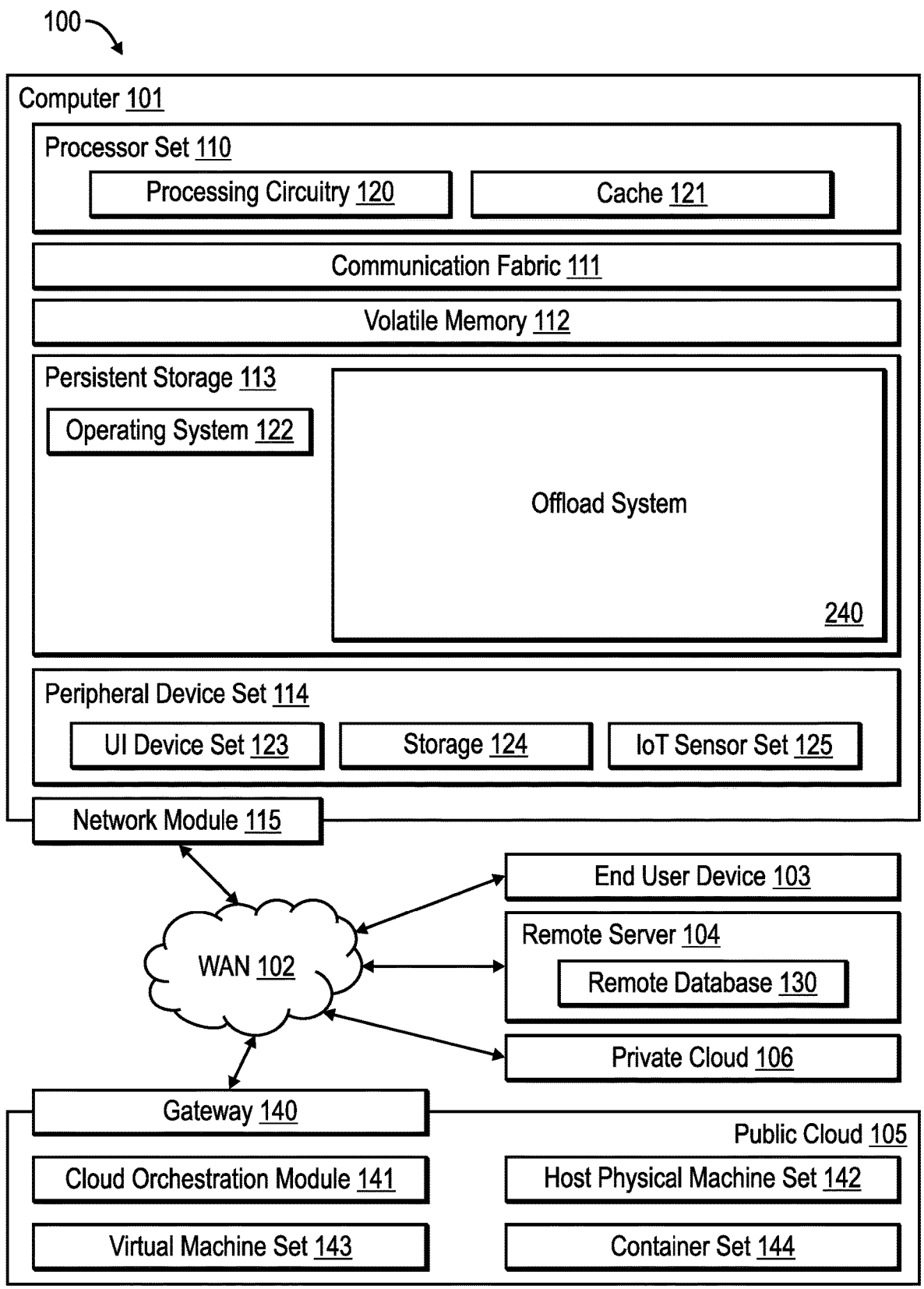
FIG. 1 illustrates a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Th terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 in accordance with certain embodiments. Computing environment 100 contains an example of an environment for the execution of at least some of the computer code involved in performing the inventive methods, such as an offload system 240 for offloading a task from an edge server that is integrated with a moving vehicle. In addition to block 240, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 240, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 240 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 240 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
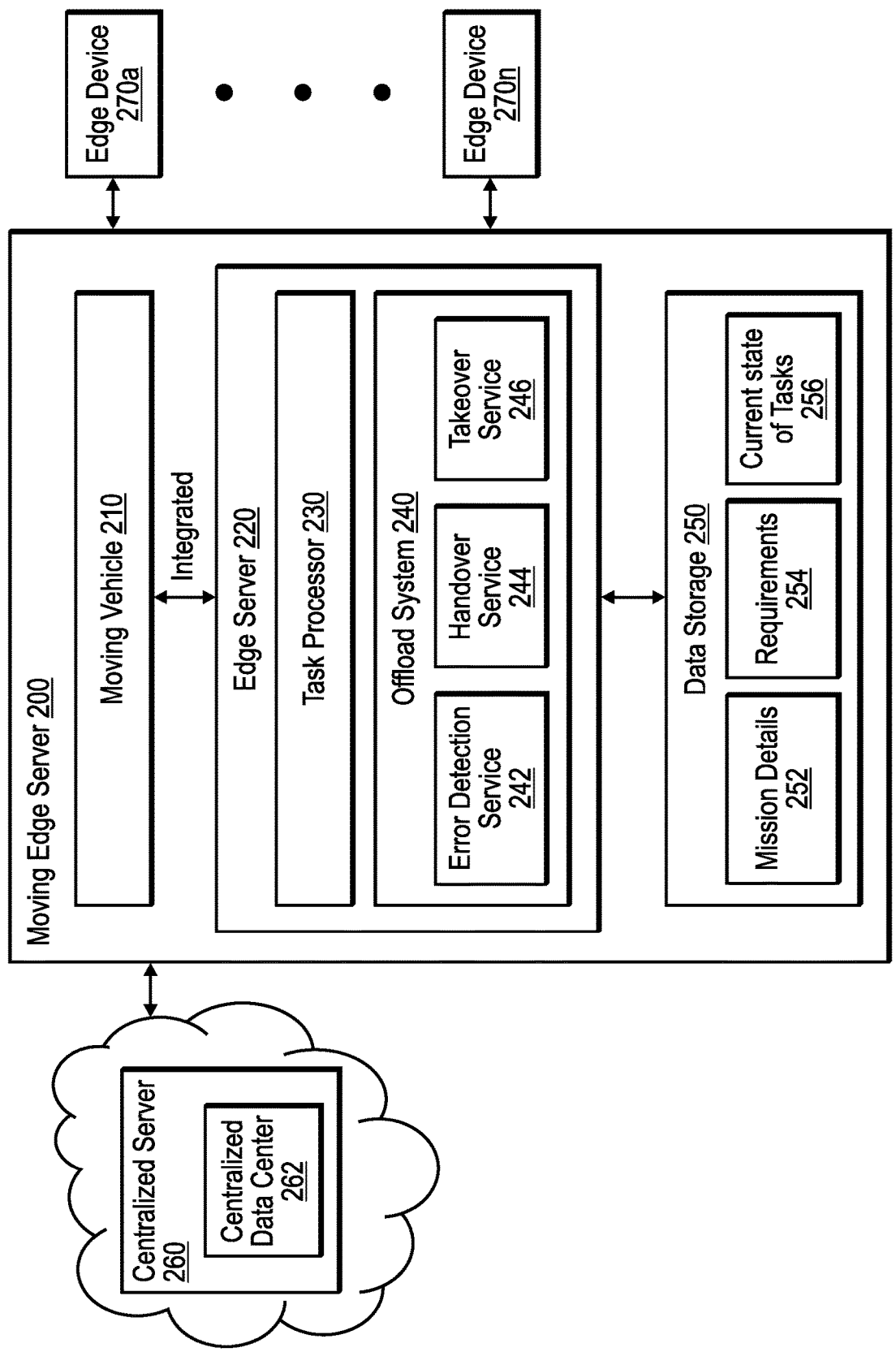
FIG. 2 illustrates a computing environment for a moving edge server in accordance with certain embodiments.

FIG. 2 illustrates a computing environment for a moving edge server 200 in accordance with certain embodiments. The moving edge server 200 includes a moving vehicle 210 integrated with an edge server 220. The edge server 220 includes a task processor 230 and an offload system 240. The offload system 240 includes an error detection service 242, a handover service 244, and a takeover service 246. In certain embodiments, the edge server 220 may be implemented with the components of computer 101, along with additional components, such as code for the task processor 230.

The error detection service 242 detects an error of hardware components (e.g., camera, storage, etc.) and/or software components (e.g., applications) at the edge server 220 and triggers the handover service 244, which broadcasts a request message that is received and processed by the takeover service 246 at other, peer moving edge servers. The request message is broadcast to request assistance with completing the one or more tasks. Also, the takeover service 246 receives and processes a request message broadcast by another, peer moving edge server. In certain embodiments, the services 242, 244, 246 are micro services.

The moving edge server 200 may be described as an edge server 220 integrated with the moving vehicle 210. For example, the moving edge server 200 may be an edge server 220 integrated with a robot, may be an edge server 220 integrated with an automotive vehicle, may be an Unmanned Aerial Vehicle (UAV) integrated with enabled Edge Computing (EC) (UAV-EC), etc. Regardless of examples described herein, embodiments are applicable to any moving edge server 200 integrated to any moving vehicle 210.

The edge server 220 is connected to data storage 250. The data storage 250 stores mission details 252 (e.g., a description of one or more tasks to be completed for the mission), requirements 254 (e.g., hardware and/or software components used by the mission), and a current state of tasks 256 (e.g., indicating which tasks are completed, which have started but are not completed, and which have not been started).

The moving edge server 200 is connected to a centralized server 260, which includes a centralized data center 262 The edge server 220 sends data for storage in the centralized data center 262. The centralized server 260 may also be described as a cloud server. In addition, the centralized server 260 may be described as being at a base station or base location relative to a target location to which the moving edge server 200 is deployed. In other embodiments, the moving edge server 200 is connected to a plurality of centralized servers, including centralized server 260. In certain embodiments, the centralized server 260 may include the components of the computer 101 with the offload system 240 replaced with other code.

The moving edge server 200 is also connected to one or more edge devices 270a . . . 270n. In certain embodiments, the edge devices 270a . . . 270n are IoT devices.

With embodiments, the moving edge server 200 moves close to the edge devices 270a . . . 270n, and the edge server 220 processes the data that is generated/collected by the edge devices 170a . . . 170n. In some embodiments, the edge server 2s0 passes back the processed data to the edge devices 170a . . . 170n, and in other embodiments, the edge server 220 passes the results back to the centralized server 260 for storage in the centralized data center 262. In yet further embodiments, the edge server 220 passes back the processed data to the edge devices 170a . . . 170n and to the centralized server 260. In certain embodiments, each edge device 170a . . . 170n may include the components of the computer 101 with the offload system 240 replaced with other code.

Figure 3:
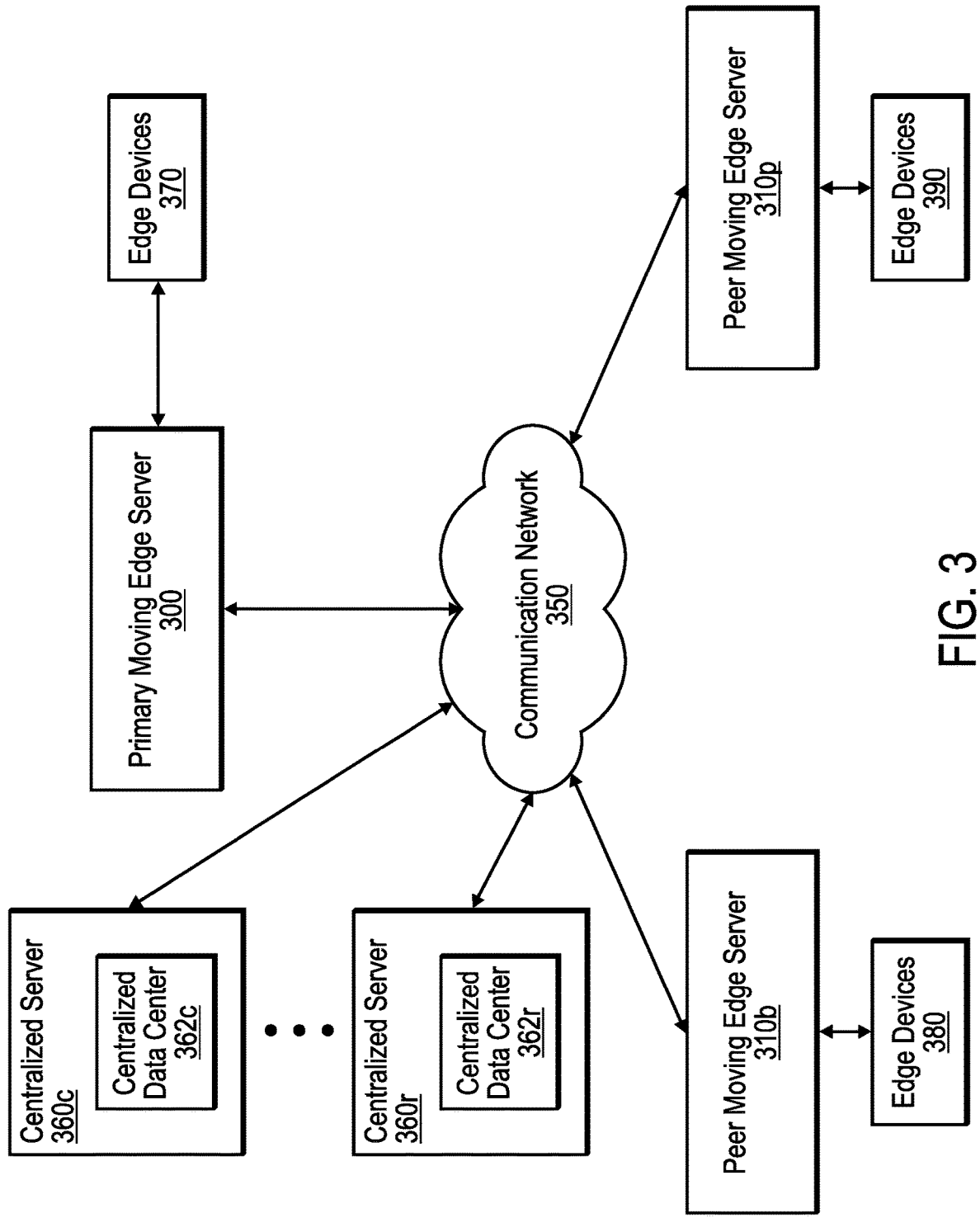
FIG. 3 illustrates moving edge servers in communication with each other in accordance with certain embodiments.

FIG. 3 illustrates moving edge servers in communication with each other in accordance with certain embodiments. In FIG. 3, a primary (first) moving edge server 300 is connected via a communication network 350 to one or more peer (second or secondary) moving edge servers 310b . . . 310p. In certain embodiments, each moving edge server 300, 310b . . . 310p has the components of the moving edge server 200. Although one moving edge server 300 is labeled "primary", each moving edge server 300, 310b . . . 310p may be a primary moving edge server relative to other moving edge servers, which are peer moving edge servers to (i.e., peers of) that primary moving edge server 300, 310b . . . 310p. In addition, the primary moving edge server 300 may be a "peer" moving edge server relative to another primary moving edge server.

Each moving edge server 300, 310b . . . 310p is also connected to centralized servers 360c . . . 360r, which respectively include centralized data centers 362c . . . 362r.

Each moving edge server 300, 310b . . . 310p communicates with respective edge devices to collect data for processing from those edge devices. In the example of FIG. 3, the primary moving edge server 300 able to communicate with (to collect data for processing) edge devices 370, the peer moving edge server 310b is able to communicate with (to collect data for processing) edge devices 380, and the peer moving edge server 310p is able to communicate with (to collect data for processing) edge devices 390. In certain embodiments, the edge devices 370, 380, 390 are at different locations (i.e., target locations), and the moving edge servers 300, 310b . . . 310p move to those target locations.

Embodiments provide a decentralized mechanism to dynamically offload a task from the primary moving edge server 300 to a peer moving edge server 310b . . . 310p or to a plurality of peer moving edge servers 310b . . . 310p when the primary moving edge server 300 fails.

For example, consider a scenario in which the moving edge server 300 is deployed to a target location to perform tasks (e.g., collecting and processing the data that is generated by the edge devices 370). If the moving edge server 300 fails on its way to the target location or while performing a task, then the moving edge server 300 identifies the failure and works with the peer moving edge servers 310b . . . 310p to deploy one or more of the peer moving edge servers 310b . . . 310p to the target location to collect and process the data from the edge devices 370.

This avoids having a centralized server 360c . . . 360r at the base location identify the failure at the primary moving edge server 300 and deploy a peer moving edge server 310b . . . 310p, which is a time consuming process for the centralized server 360c . . . 360r.

In certain embodiments, having the primary moving edge server 300 and the peer moving edge server 310b . . . 310p communicate to hand over tasks avoids any delay caused by the peer moving edge server 310b . . . 310p taking some time to reach the target location after deployment by the centralized server 360c . . . 360r and so avoids impact to Quality of Service (QOS).

Embodiments that provide a decentralized mechanism to dynamically offload a task from the primary moving edge server 300 to one or more peer moving edge servers 310b . . . 310b when the primary moving edge server 300 fails include an error detection service, a handover service, and a takeover service that coordinate with each other to reassign the task from the primary moving edge server to one or more peer moving edge servers.

With embodiments, the primary moving edge server 300 and each peer moving edge server 310b . . . 310b is assigned a mission, which indicates a target location and one or more tasks. Each moving edge server 300, 310b . . . 310b moves to the target location to perform the one or more tasks (e.g., collect data from edge devices, process the data in a particular manner, etc.).

In certain embodiments, the error detection service of the primary moving edge server 300 identifies hardware component failures in the moving vehicle and/or the edge server in parallel with software component failures (e.g., application anomalies) in the moving vehicle and/or the edge server, aggregates the failures to determine the magnitude of the failure, and triggers the handover service if the aggregated failure is determined to prevent completion of the mission. For example, if the mission includes a task that involves capturing images, and the camera has failed, then failure of the camera prevents completion of the mission (i.e., is fatal to the mission). In certain embodiments, the hardware and/or software components may send a signal periodically if they are functioning, and, if the error detection service does not receive an expected signal from a particular hardware or software component, the error detection service determines that the particular hardware or software component has failed.

In certain embodiments, the handover service of the primary moving edge server 300 determines the current state of each task (including the nature of each task) of the mission and requirements (including computing requirements, energy requirements, hardware and/or software component requirements, and security requirements). Then, the handover service broadcasts the mission details, the requirements, and the current state of each task to the peer moving edge servers 310b . . . 310p.

In certain embodiments, the takeover service of the peer moving edge server 310b . . . 310p evaluates the request message sent by the handover service of the primary moving edge server 300 and determines whether the peer moving edge server 310b . . . 310p is able to take up one or more tasks either completely or partially by considering: 1) the current state of each task being executed by the peer moving edge server 310b . . . 310p (e.g., including a priority of each task), 2) capabilities that may match the requirements, and 3) error detection that identifies failures at the peer moving edge server 310b . . . 310p. Then, the takeover service of the peer moving edge server 310b . . . 310p responds to the handover service of the primary moving edge server 300 with an acknowledgement. The acknowledgement may indicate the current state of each task, the capabilities, and/or any failures. The acknowledgement is sent in response to the request message.

In certain embodiments, the handover service of the primary moving edge server 300 selects one or more optimal peer moving edge servers 310b . . . 310p and re-assigns one or more tasks, either partially or completely, to the selected one or more optimal peer moving edge servers 310b . . . 310p. The handover service may make the selection of the one or more optimal peer moving edge servers 310b . . . 310p based on the response from each of the peer moving edge servers 310b . . . 310p.

Figure 4:
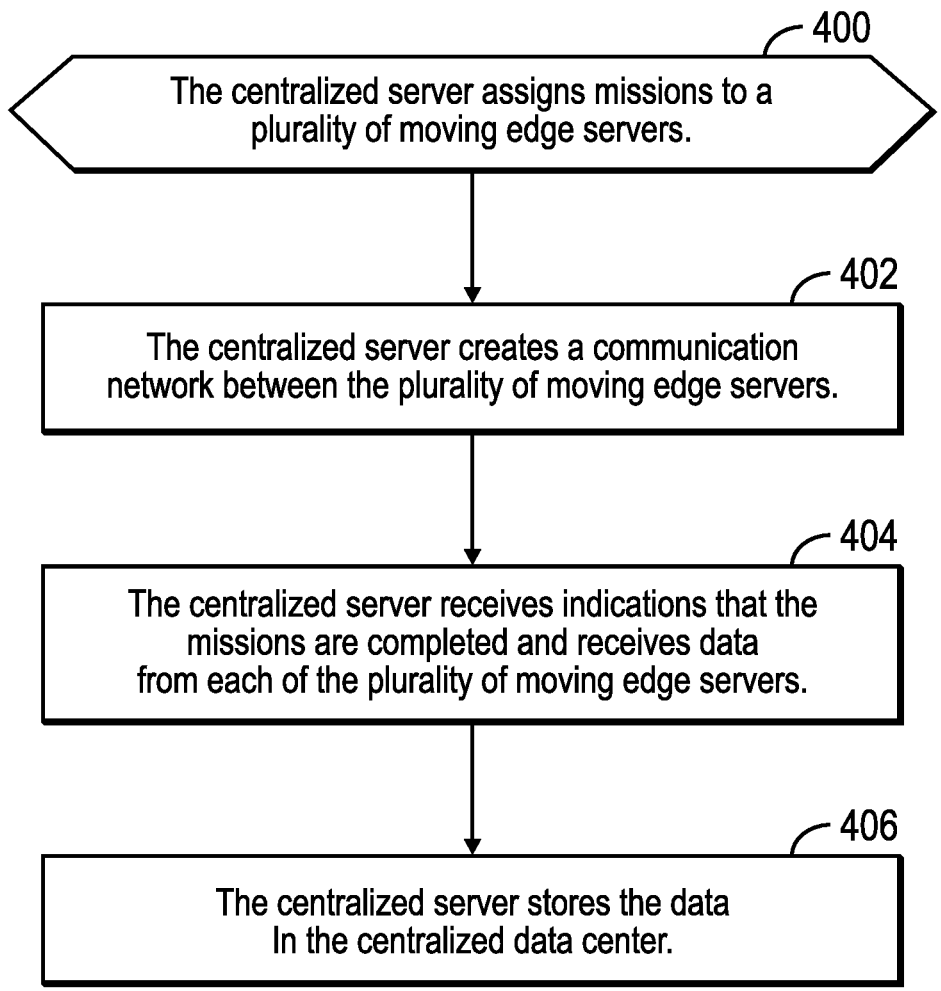
FIG. 4 illustrates, in a flowchart, operations performed by a centralized server in accordance with certain embodiments.

FIG. 4 illustrates, in a flowchart, operations performed by a centralized server in accordance with certain embodiments. Control begins at block 400 with the centralized server 360c . . . 360r assigning missions to a plurality of moving edge servers 300, 310b . . . 310p. Each of the missions includes one or more tasks, a target location to which the moving edge server is to be deployed, sensor requirements, computing requirements, priority of each of the one or more tasks, security requirements, etc.), along with a current state of the one or more tasks.

In block 402, the centralized server 360c . . . 360r creates a communication network between the plurality of moving edge servers 300, 310b . . . 310p. In certain embodiments, based on the range, communication network may be created using Wi-Fi Direct®, Bluetooth® 5.0 or any other radio wave technology (e.g., a wireless mesh network), etc. (WI-FI DIRECT is a registered trademark of Wi-Fi Alliance in the United States and/or other countries.) (Bluetooth® is a registered trademark of Bluetooth SIG in the United States and/or other countries.)

In block 404, the centralized server 360c . . . 360r receives indications that the missions are completed and receives data from each of the plurality of moving edge servers 300, 310b . . . 310p. In block 406, the centralized server 360c . . . 360r stores the data in the centralized data center 362c . . . 362r.

Figure 5A:
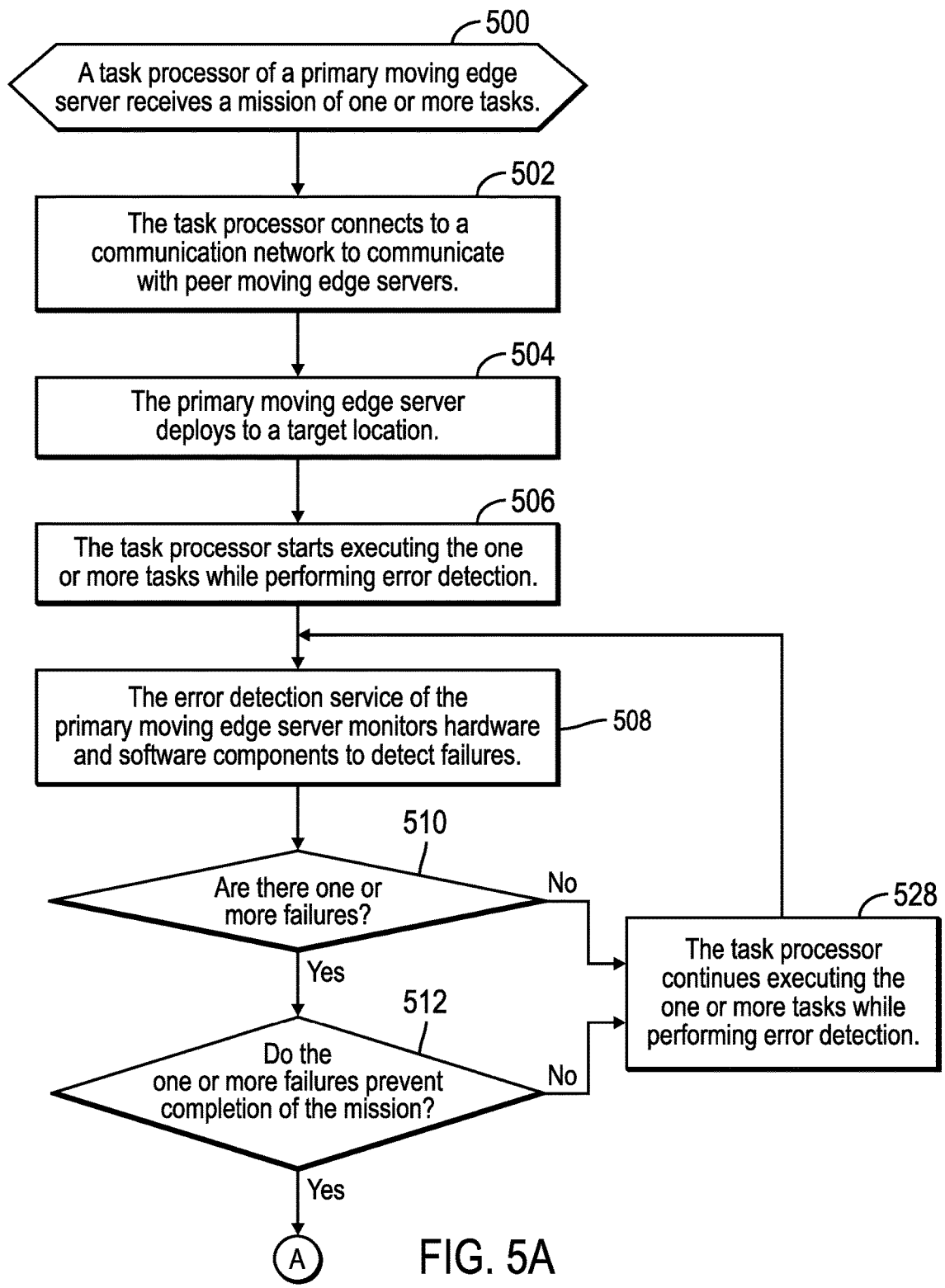
FIGS. 5A and 5B illustrate, in a flowchart, operations performed by a primary moving edge server in accordance with certain embodiments.
Figure 5B:
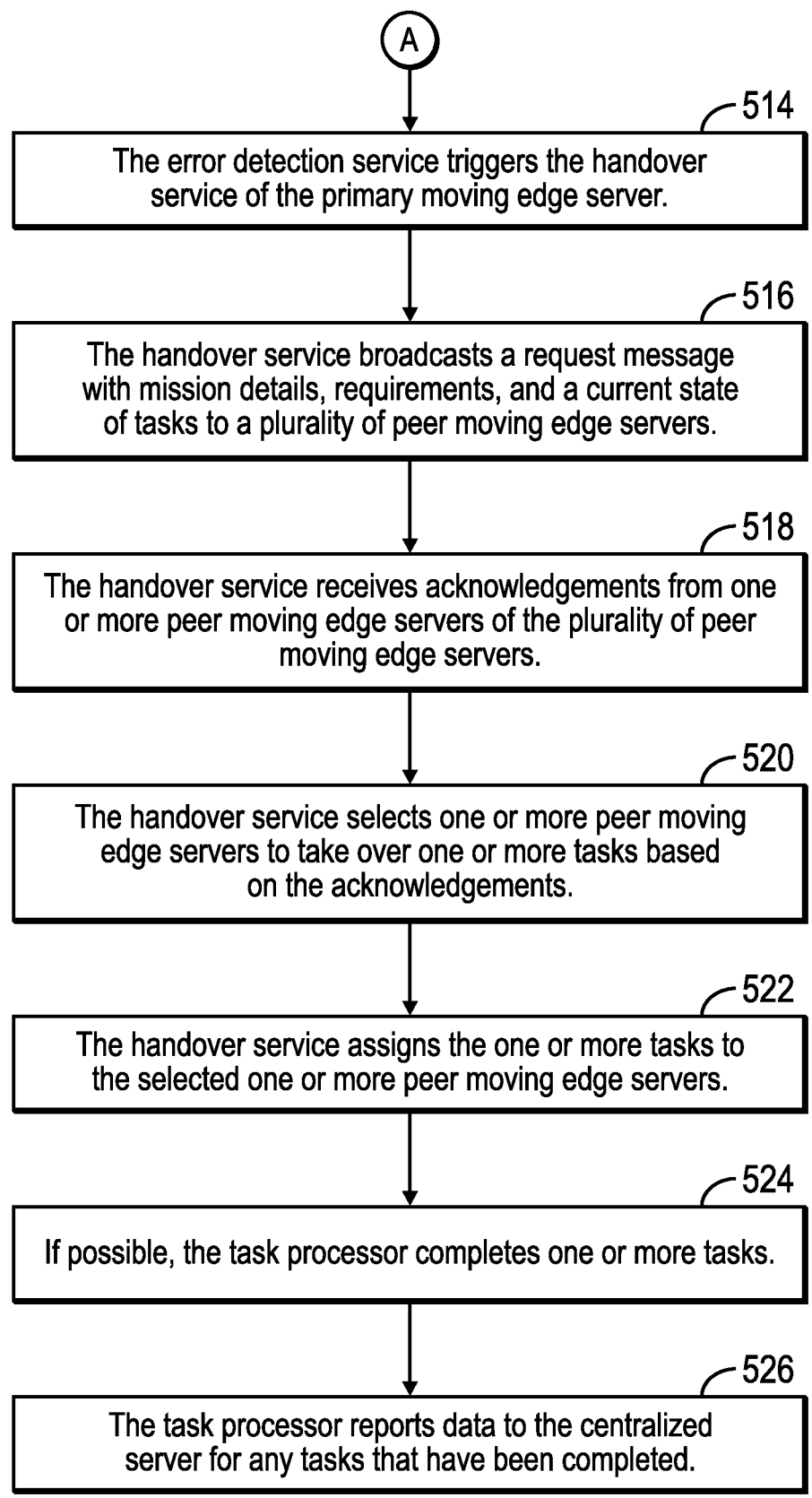

FIGS. 5A and 5B illustrate, in a flowchart, operations performed by a primary moving edge server in accordance with certain embodiments. Control begins at block 500 with the task processor of the primary moving edge server 300 receiving a mission of one or more tasks. In block 502, the task processor of the primary moving edge server 300 connects to a communication network to communicate with peer moving edge servers 310b . . . 310p. In block 504, the primary moving edge server 300 deploys (i.e., moves via the moving vehicle) to a target location. In block 506, the task processor of the primary moving edge server 300 starts executing the one or more tasks while performing error detection.

In block 508, the error detection service of the primary moving edge server 300 monitors hardware and software components to detect failures. In block 510, the error detection service of the primary moving edge server 300 determines whether there are one or more failures. If so, processing continues to block 512, otherwise, processing continues to block 528. The one or more failures may be hardware component failures and/or software component failures.

In block 512, the error detection service of the primary moving edge server 300 determines whether the one or more failures prevents completion of the mission. If so, processing continues from block 512 (FIG. 5A) to block 514 (FIG. 5B), otherwise, processing continues to block 528. For example, if the failure prevents one or more tasks of the mission from being completed, then the failure prevents completion of the mission.

In block 528, the task processor of the primary moving edge server 300 continues executing the one or more tasks while performing error detection.

In block 514, the error detection service of the primary moving edge server 300 triggers the handover service of the primary moving edge server 300. In block 516, the handover service of the primary moving edge server 300 broadcasts a request message (i.e., a request for help) with mission details (e.g., one or more tasks to be completed), requirements, and a current state of tasks to a plurality of peer moving edge servers 310b . . . 310p. In block 518, the handover service of the primary moving edge server 300 receives acknowledgements from one or more peer moving edge servers 310b . . . 310p of the plurality of peer moving edge servers 310b . . . 310p. In certain embodiments, the one or more peer moving edge servers 310b . . . 310p include a subset of the plurality of peer moving edge servers 310b . . . 310p In certain other embodiments, the one or more peer moving edge servers 310b . . . 310p include all of the plurality of peer moving edge servers 310b . . . 310p. The acknowledgement from a peer moving edge server 310b . . . 310p may indicate the current state and priority of each task, the capabilities, and/or any failures at the peer moving edge server 310b . . . 310p. In block 520, the handover service of the primary moving edge server 300 selects one or more peer moving edge servers 310b . . . 310p to take over one or more tasks based on the acknowledgements. In certain embodiments, the one or more peer moving edge servers 310b . . . 310p selected are a subset of the peer moving edge servers 310b . . . 310p which sent acknowledgements. In certain other embodiments, the one or more peer moving edge servers 310b . . . 310p selected include all of the peer moving edge servers 310b . . . 310p which sent acknowledgements. In certain embodiments, the selection is based on one or more factors (e.g., priority of tasks, location, ability to take over complete (versus partial) task, available hardware components, available software components, etc.). For example, a peer moving edge server 310b . . . 310p that does not have any higher priority tasks than any task to be handed over is selected over a peer moving edge server 310b . . . 310p that has any such higher priority tasks. As another example, a peer moving edge server 310b . . . 310p that is closer in location to the target location of the primary moving edge server 300 is selected over a peer moving edge server 310b . . . 310p that is farther in location to the target location. As a yet other example, a peer moving edge server 310b . . . 310p that can complete an entire task is selected over a peer moving edge server 310b . . . 310p that can complete that task partially. As a further example, a peer moving edge server 310b . . . 310p with multiple cameras for a tasks that uses a camera is selected over a peer moving edge server 310b . . . 310p with one camera (e.g., if the one camera fails, then the task cannot be completed). In block 522, the handover service of the primary moving edge server 300 assigns the one or more tasks to the selected one or more peer moving edge servers 310b . . . 310p. In block 524, if possible, the task processor of the primary moving edge server 300 completes one or more tasks. In block 526, the task processor of the primary moving edge server 300 reports data to the centralized server 360c . . . 360r for any tasks that have been completed (either partially or entirely).

Figure 6A:
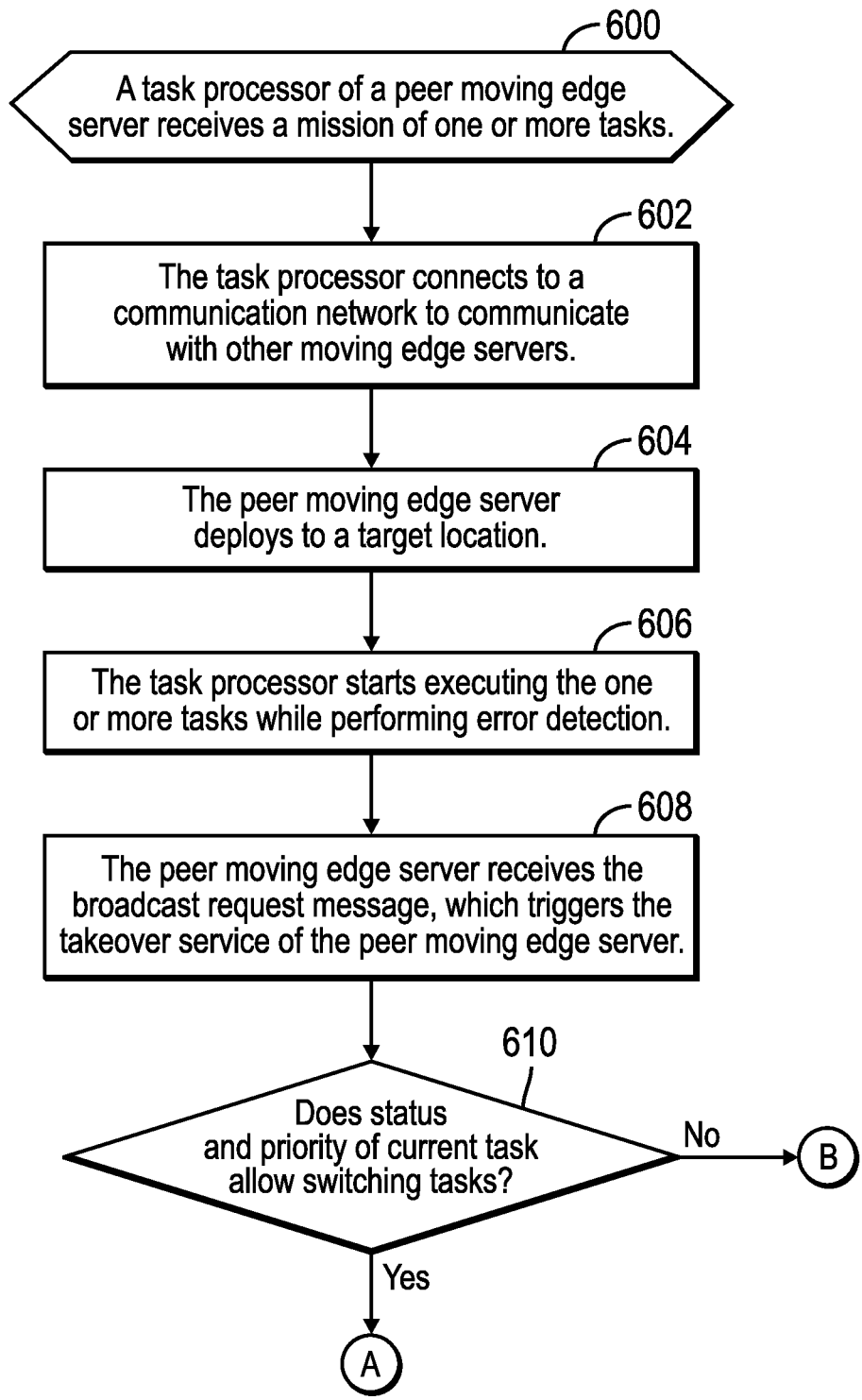
FIGS. 6A and 6B illustrate, in a flowchart, operations performed by a peer moving edge server in accordance with certain embodiments.
Figure 6B:
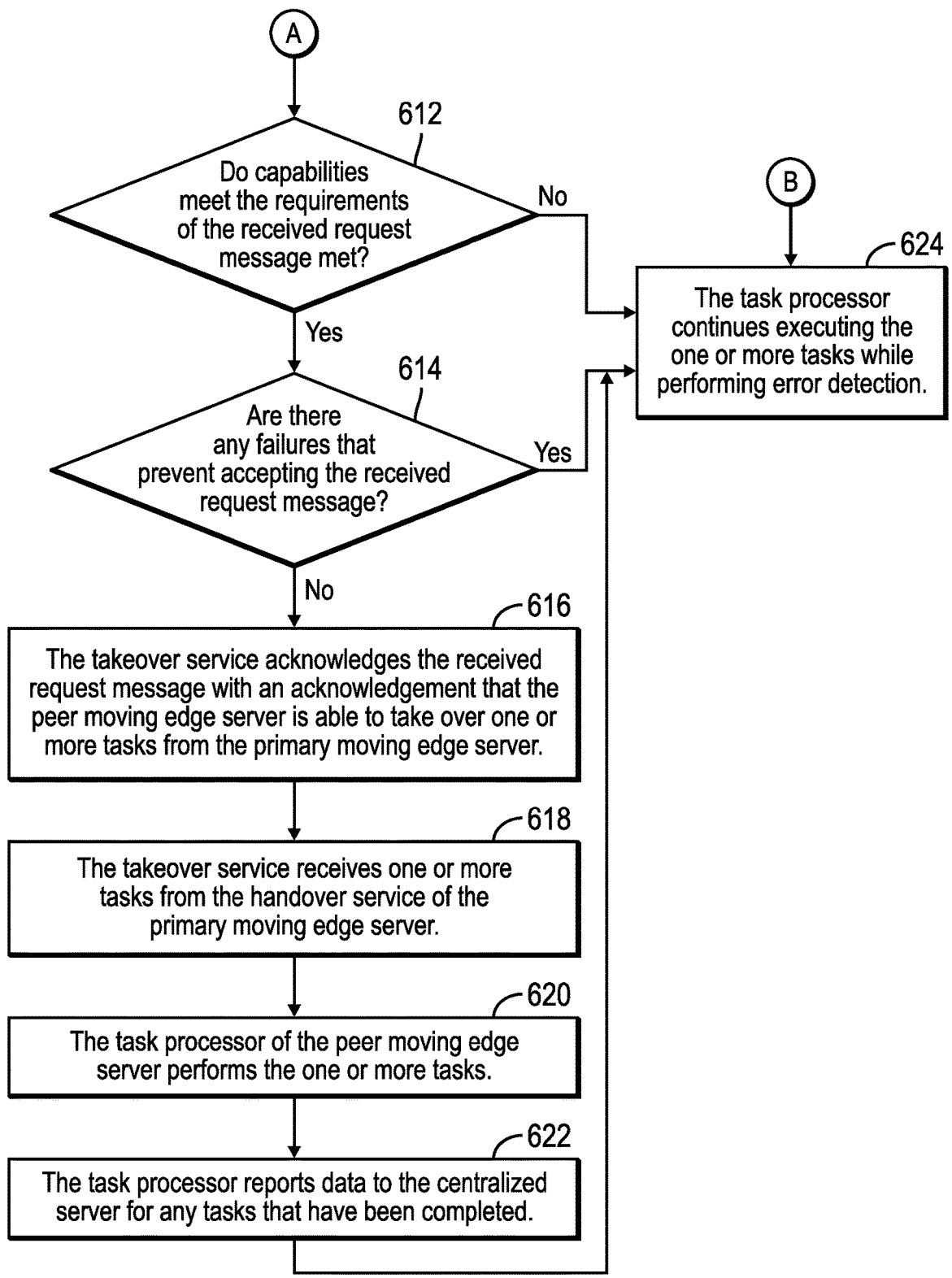

FIGS. 6A and 6B illustrate, in a flowchart, operations performed by a peer moving edge server in accordance with certain embodiments. Control begins at block 600 with the task processor of the peer moving edge server 310b . . . 310p receiving a mission of one or more tasks. In block 602, the task processor of the peer moving edge server 310b . . . 310p connects to a communication network to communicate with other moving edge servers 300, 310b . . . 310p. In block 604, the peer moving edge server 310b . . . 310p deploys (i.e., moves via the moving vehicle) to a target location. In block 606, the task processor of the peer moving edge server 310b . . . 310p starts executing the one or more tasks while performing error detection. The error detection performed may include the operations of blocks 508-528.

In block 608, the peer moving edge server 310b . . . 310p receives the broadcast request message (from the primary moving edge server 300), which triggers the takeover service of the peer moving edge server 310b . . . 310p. In block 610, the takeover service of the peer moving edge server 310b . . . 310p determines whether the status and priority of a current task that is being executed allows switching tasks. This includes evaluating the status and priority of the current task against the received request message (e.g., if the priority of the current task is higher than the priority of any task in the request message, then the peer moving edge server 310b . . . 310p is not able to switch tasks to execute any task in the request message). If so, processing continues from block 610 (FIG. 6A) to block 612 (FIG. 6B), otherwise, processing continues to block 624 9FIG. 6B).

In block 612, the takeover service of the peer moving edge server 310b . . . 310p determines whether capabilities of the peer moving edge server 310b . . . 310p meet the requirements of the received request message met. If so, processing continues to block 614, otherwise, processing continues to block 624. For example, if a task in the request message uses a camera, and the peer moving edge server 310b . . . 310p does not have a camera, then the capabilities do not meet the requirements.

In block 614, the takeover service of the peer moving edge server 310b . . . 310p determines whether there are any failures (detected by the error detecting service of the peer moving edge server 310b . . . 310p) that prevent accepting the received request message. If so, processing continues to block 624, otherwise, processing continues to block 616. For example, if a task in the request message uses a camera, and the camera of the peer moving edge server 310b . . . 310p has failed, then such a failure prevents the peer moving edge server 310b . . . 310p from accepting the task.

In block 616, the takeover service of the peer moving edge server 310b . . . 310p acknowledges the received request message with an acknowledgement that the peer moving edge server is able to take over one or more tasks from the primary moving edge server. In block 618, the takeover service of the peer moving edge server 310b . . . 310p receives one or more tasks from the handover service of the primary moving edge server 300. In block 620, the task processor of the peer moving edge server 310b . . . 310p performs the one or more tasks. In block 622, the task processor of the peer moving edge server 310*b* . . . 310*p* reports data to the centralized server for any tasks that have been completed (either partially or entirely). In certain embodiments, after the peer moving edge server 310*b* . . . 310*p* takes over a task and then is unable to complete the task, the peer moving edge server 310*b* . . . 310*p* broadcasts a request message to request assistance in completing the task.

In block 624, the task processor of the peer moving edge server 310*b* . . . 310*p* continues executing the one or more tasks of the mission assigned to the peer moving edge server 310*b* . . . 310*p* (by the centralized server 360*c* . . . 360*r*) while performing error detection.

In certain embodiments, the error detection service monitors the health of the hardware and software components within the primary moving edge server 300. The error detection service may generate an interrupt based on detecting an error.

In certain embodiments, the error detection service may be divided into three parts: 1) a moving vehicle's hardware health monitor (e.g., monitors components of the moving vehicle, such as fans, batteries, motors, cameras, etc.); 2) an edge server's hardware health monitor (e.g., monitors hardware components, such as processors, disks, storage (e.g., RAM), etc.; and 3) software health monitor (e.g., monitors software components of both the moving vehicle and the edge server).

In certain embodiments, the error detection service aggregates the hardware health data from the moving vehicle's hardware health monitor, the edge server's hardware health monitor, and the software anomalies monitoring system and then determines a magnitude of the failure. The error detection service may consider the requirements (i.e., pre-requisites) of the task (e.g., sensor requirements, energy requirements, computing requirements, etc.) and verifies whether the failure prevents completion of the task.

For example, if the moving vehicle's camera fails and a particular task of a mission does not require a camera, then failure of the camera does not prevent the task from being completed, and the primary moving edge server 300 continues to execute the task.

As another example, if the edge server's disk fails and a particular task of a mission requires the disk to store data, then failure of the disk prevents the task from being completed, and the primary moving edge server 300 starts the hand over process to hand over the task to a peer moving edge server 310*b* . . . 310*p*.

In certain embodiments, during failures that prevent completion of a task, a current state of the task is determined. The progress of the task may be categorized into two states: 1) not yet started and 2) started and partially completed.

When the failure prevents completion of the task, the error detection service then triggers the handover service, which broadcasts a request message to the peer moving edge servers 310*b* . . . 310*p* about the failure and requests help in executing one or more tasks.

In certain embodiments, the handover service broadcasts the mission details (e.g., target location, sensor requirements, computing requirements, priority of the one or more tasks, security requirements, etc.), along with current state of the tasks.

In certain embodiments, the takeover service of the peer moving edge server 310*b* . . . 310*p* determines a current state of tasks of a mission assigned to that peer moving edge server 310*b* . . . 310*p* by the centralized server 360*c* . . . 360*r* and a priority of the tasks. The takeover service then analyses the requirements needed to take over the one or more tasks requested by the primary moving edge server 300.

The takeover service of the peer moving edge server 310*b* . . . 310*p* co-ordinates with the error detection service of that peer moving edge server 310*b* . . . 310*p* to check for possible failures of hardware components and/or software components at that peer moving edge server 310*b* . . . 310*p*. If the peer moving edge server 310*b* . . . 310*p* does not have capabilities that meet the requirements to executed the one or more tasks broadcasted, then the peer moving edge server 310*b* . . . 310*p* rejects the request message from the primary moving edge server 300.

For example, if the request message requires the edge server of the peer moving edge server 310*b* . . . 310*p* to have 32 GigaBytes (GB) of RAM, and the peer moving edge server 310*b* . . . 310*p* does not have 32 GB of RAM, the peer moving edge server 310*b* . . . 310*p* rejects the request message. In certain embodiments, rejecting the request message means that the peer moving edge server 310*b* . . . 310*p* does not respond to the broadcast request message. In other embodiments, rejecting the request message means that the peer moving edge server 310*b* . . . 310*p* responds to the broadcast request message that the Gigabytes peer moving edge server 310*b* . . . 310*p* is not able to assist.

In certain embodiments, if the peer moving edge server 310*b* . . . 310*p* is able to assist with one or more tasks partially or completely, then the peer moving edge server 310*b* . . . 310*p* sends an acknowledgement to the primary moving edge server 300 with the amount of the one or more tasks the peer moving edge server 310*b* . . . 310*p* is able to take over.

In certain embodiments, upon receiving the acknowledgement from one or more peer moving edge servers 310*b* . . . 310*p*, the handover service of the primary moving edge server 300 identifies the optimal peer moving edge servers 310*b* . . . 310*p* that have sent acknowledgements to take up the one or more tasks. Then, the handover service hands over the one or more tasks to one or more of the peer moving edge servers 310*b* . . . 310*p* based on the availability.

In certain embodiments, the handover service also determines whether the primary moving edge server 300 is able to complete a task partially based on the failure. For example: if the battery failed and there is enough battery to complete the task partially, then the primary moving edge server 300 continues to work on the task and hands over the rest of the task to the peer moving edge server 310*b* . . . 310*p*. This may also happen if the error is detected during the midst of the mission.

If the failure is detected before starting any task of the mission, then the primary moving edge server 300 may hand over the complete mission to the peer moving edge server 310*b* . . . 310*p*. In addition, the handover service avoids redundant or duplicate task processing.

In certain embodiments, the error detection service of the peer moving edge server 310*b* . . . 310*p* continues to monitor the health of the peer moving edge server 310*b* . . . 310*p* and may also broadcast a request message for help. if needed, based on any failure.

Figure 7:
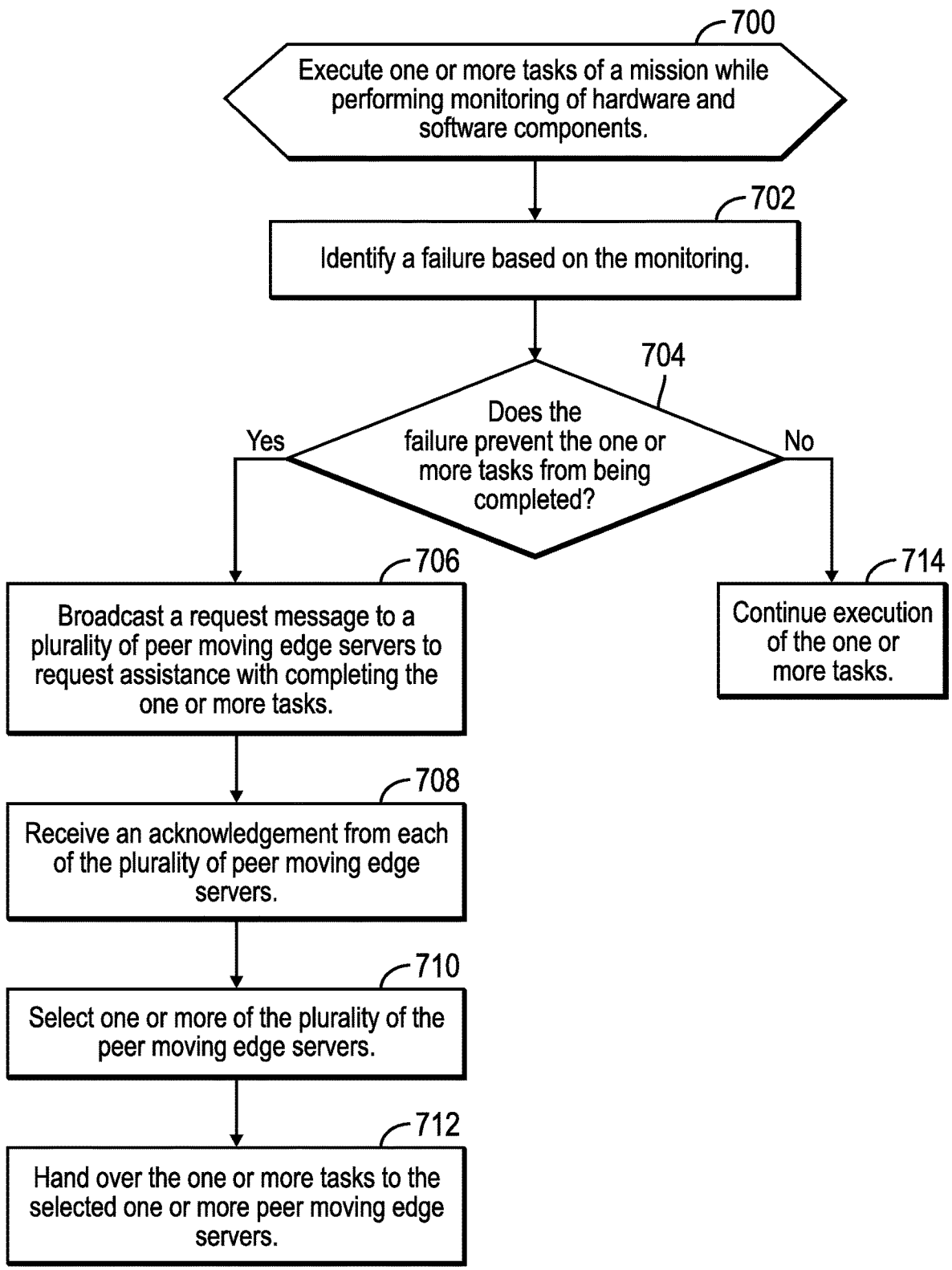
FIG. 7 illustrates, in a flowchart, operations for offloading a task from an edge server that is integrated with a moving vehicle in accordance with certain embodiments.

FIG. 7 illustrates, in a flowchart, operations for offloading a task from an edge server that is integrated with a moving vehicle in accordance with certain embodiments. The operations of FIG. 7 occur under the control of a primary moving edge server 300. Control begins at block 700 with the primary moving edge server 300 executing one or more tasks of a mission while performing monitoring of hardware and software components. In block 702, the primary moving edge server 300 identifies a failure based on the monitoring. In block 704, the primary moving edge server 300 determines whether the failure prevents the one or more tasks from being completed. If so, processing continues to block 706, otherwise, processing continues to block 714.

In block 706, the primary moving edge server 300 broadcast a request message to a plurality of peer moving edge servers to request assistance with completing the one or more tasks. In block 708, the primary moving edge server 300 receives an acknowledgement from each of the plurality of peer moving edge servers. In block 710, the primary moving edge server 300 selects one or more of the plurality of the peer moving edge servers. In block 712, the primary moving edge server 300 hands over the one or more tasks to the selected one or more peer moving edge servers.

In block 714, the primary moving edge server 300 continues execution of the one or more tasks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer program product, the computer program product comprising a computer readable storage medium having program instructions embodied therewith, the program instructions executable by a processor of a primary moving edge server to cause the processor to perform operations for:
    executing one or more tasks of a mission while performing monitoring of hardware and software components; and
    in response to the monitoring, identifying a failure;
        in response to determining that the failure prevents the one or more tasks from being completed,
            broadcasting a request message to a plurality of peer moving edge servers to request assistance with completing the one or more tasks;
            receiving an acknowledgement from each of the plurality of peer moving edge servers;
            selecting one or more of the plurality of the peer moving edge servers; and
            handing over the one or more tasks to the selected one or more peer moving edge servers; and
    in response to determining that the failure does not prevent the one or more tasks from being completed, continuing execution of the one or more tasks.

2. The computer program product of claim 1, wherein the primary moving edge server comprises a moving vehicle integrated with an edge server, and wherein the primary moving edge server moves to a target location to collect data from one or more edge devices.

3. The computer program product of claim 2, wherein the program instructions for monitoring are executable by the processor to cause the processor to perform further operations for:
    identifying a plurality of failures selected from a group comprising hardware component failures and software component failures in one of the moving vehicle and the edge server in parallel; and
    aggregating the plurality of failures to determine whether the aggregated failures prevent the one or more tasks from being completed.

4. The computer program product of claim 1, wherein the request message comprises the one or more tasks and requirements.

5. The computer program product of claim 4, wherein a peer moving edge server of the plurality of peer moving edge servers determines whether any failure has been identified at the peer moving edge server that prevents taking over the one or more tasks and whether capabilities are available at the peer moving edge server that match the requirements.

6. The computer program product of claim 1, wherein a centralized server assigns the mission to the primary moving edge server and assigns other missions to each of the plurality of peer moving edge servers.

7. The computer program product of claim 1, wherein the primary moving edge server completes a task of the one or more tasks before handing over remaining one or more tasks.

8. A method implemented at a primary moving edge server, comprising operations for:
- executing one or more tasks of a mission while performing monitoring of hardware and software components;
- in response to the monitoring, identifying a first failure;
- in response to determining that the first failure prevents the one or more tasks from being completed,
  - broadcasting a request message to a plurality of peer moving edge servers to request assistance with completing the one or more tasks;
  - receiving an acknowledgement from each of the plurality of peer moving edge servers;
  - selecting one or more of the plurality of the peer moving edge servers; and
  - handing over the one or more tasks to the selected one or more peer moving edge servers;
- in response to additional monitoring, identifying a second failure; and
- in response to determining that the second failure does not prevent the one or more tasks from being completed, continuing execution of the one or more tasks.

9. The method of claim 8, wherein the primary moving edge server comprises a moving vehicle integrated with an edge server, and wherein the primary moving edge server moves to a target location to collect data from one or more edge devices.

10. The method of claim 9, further comprising operations for:
- identifying a plurality of failures selected from a group comprising hardware component failures and software component failures in one of the moving vehicle and the edge server in parallel; and
- aggregating the plurality of failures to determine whether the aggregated failures prevent the one or more tasks from being completed.

11. The method of claim 8, wherein the request message comprises the one or more tasks and requirements.

12. The method of claim 11, wherein a peer moving edge server of the plurality of peer moving edge servers determines whether any failure has been identified at the peer moving edge server that prevents taking over the one or more tasks and whether capabilities are available at the peer moving edge server that match the requirements.

13. The method of claim 8, wherein a centralized server assigns the mission to the primary moving edge server and assigns other missions to each of the plurality of peer moving edge servers.

14. The method of claim 8, wherein the primary moving edge server completes a task of the one or more tasks before handing over remaining one or more tasks.

15. A computer system of a primary moving edge server, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more computer-readable memories, to perform operations comprising:
- executing one or more tasks of a mission while performing monitoring of hardware and software components; and
- in response to the monitoring, identifying a failure;
  - in response to determining that the failure prevents the one or more tasks from being completed,
    - broadcasting a request message to a plurality of peer moving edge servers to request assistance with completing the one or more tasks;
    - receiving an acknowledgement from each of the plurality of peer moving edge servers;
    - selecting one or more of the plurality of the peer moving edge servers; and
    - handing over the one or more tasks to the selected one or more peer moving edge servers; and
- in response to determining that the failure does not prevent the one or more tasks from being completed, continuing execution of the one or more tasks.

16. The computer system of claim 15, wherein the primary moving edge server comprises a moving vehicle integrated with an edge server, and wherein the primary moving edge server moves to a target location to collect data from one or more edge devices.

17. The computer system of claim 16, wherein the program instructions for monitoring are executable by the processor to cause the processor to perform further operations for:
- identifying a plurality of failures selected from a group comprising hardware component failures and software component failures in one of the moving vehicle and the edge server in parallel; and
- aggregating the plurality of failures to determine whether the aggregated failures prevent the one or more tasks from being completed.

18. The computer system of claim 15, wherein the request message comprises the one or more tasks and requirements.

19. The computer system of claim 18, wherein a peer moving edge server of the plurality of peer moving edge servers determines whether any failure has been identified at the peer moving edge server that prevents taking over the one or more tasks and whether capabilities are available at the peer moving edge server that match the requirements.

20. The computer system of claim 15, wherein a centralized server assigns the mission to the primary moving edge server and assigns other missions to each of the plurality of peer moving edge servers.

* * * * *